United States Patent [19]

Muncke et al.

[11] 4,418,955
[45] Dec. 6, 1983

[54] SUPPORT UNIT FOR A CAB IN UTILITARIAN VEHICLES

[75] Inventors: Ludwig Muncke, Lohr; Wolfgang Kaus, Lohr-Wombach, both of Fed. Rep. of Germany

[73] Assignee: G. L. Rexroth GmbH, Lohr, Fed. Rep. of Germany

[21] Appl. No.: 279,465

[22] Filed: Jul. 1, 1981

[30] Foreign Application Priority Data

Jul. 3, 1980 [DE] Fed. Rep. of Germany ....... 3025269

[51] Int. Cl.$^3$ .............................................. B60P 3/03
[52] U.S. Cl. ................................. 296/190; 180/89.12; 296/35.1
[58] Field of Search ............. 296/190, 102, 146, 35.1; 180/89.12

[56] References Cited

U.S. PATENT DOCUMENTS 4,235,470 11/1980 Kauss et al. ...................... 296/190
4,330,149  5/1982 Salmon ............................. 296/190

FOREIGN PATENT DOCUMENTS 1555946  8/1970  Fed. Rep. of Germany.

Primary Examiner—Richard A. Bertsch
Attorney, Agent, or Firm—Oblon, Fisher, Spivak, McClelland & Maier

[57] ABSTRACT

Disclosed is a support unit for the cab of a utilitarian vehicle having a separate cab and chassis. The support unit includes a hydraulic piston and cylinder, including a compression spring, connected between the cab and the chassis. Fixed to the hydraulic support cylinder unit is a directional control valve which selectively directs and drains pressurized hydraulic fluid to or from the hydraulic support cylinder unit. The directional control valve is journalled to a lever pivoted to the cab. Also journalled to the lever are an elastically centered rod and an absorber element having an inelastically adjustable length. Dynamic fluctuations of the distance between the chassis and cab are opposed by the hydraulic support cylinder unit as actuated by the directional control valve. Static fluctuations in the distance between the chassis and the cab are accommodated by the hydraulic support cylinder unit together with the absorber element.

4 Claims, 2 Drawing Figures

SUPPORT UNIT FOR A CAB IN UTILITARIAN VEHICLES

BACKGROUND OF THE INVENTION

1. Field of the Invention

The invention relates to a support unit for a cab in utilitarian vehicles.

2. Description of the Prior Art

A support unit of this type is known from DE-OS No. 15 55 946. In this known support unit, which is intended in particular for the driver's cab of a tractor, the valve body of the directional control valve is connected to an actuator which adjusts the directional control valve whenever the cab assumes a position deviating from the horizontal. As a result, the adjustment of the directional control valve is effected in a manner in which fluid is either drained from or fed into the support cylinder, in order to lengthen or shorten it, respectively, thereby compensating for a deviation of the cab from the horizontal position. The known support unit also includes a spring element which is intended to serve as an elastic attachment of the cab to the chassis of the vehicle, in order to protect the driver from the vibrations which are transmitted by the unsprung axles of the utilitarian vehicle. A spring connection of this type necessarily leads to vibratory and rocking motions of the cab relative to the chassis which may be absorbed to some extent but which, nevertheless, can be felt by the user of the cab and which may impair the safe operation of the vehicle in traffic.

SUMMARY OF THE INVENTION

The invention has as an object the provision of a support unit of the above type in which the relative motions between chassis and cab, i.e. the vibrations and rocking motions, are largely prevented so that the cab is thereby kept essentially free of motion.

In the case of a relative motion between the cab and support cylinder, the invention provides for a drain or admission of fluid from or to a support cylinder so that the latter, dependent upon whether the vehicle passes through a pothole or rides over a bump, is either extended or shortened, so that the cab is kept at the same elevation. For instance, when passing over a bump, the spring element is compressed. In the design of the invention, however, even a minor compression of the spring element results in a shortening of the support cylinder, so that the spring element is not nearly so strongly compressed as would be the case without a shortening of the support cylinder and, consequently, very little spring energy, which could be the cause of vibrations and rocking motions of the cab, must be stored within the spring element. The support unit of the invention therefore provides the effect that the greatest dynamically caused differences in the distance between the chassis and the cab, which usually would have to be absorbed by the spring element while storing spring energy, are taken up by the support cylinder, thus preventing vibrations and rocking motions of the cab.

The support unit is not only subject to dynamic stresses when the vehicle travels, but is also under a steady static stress due to the weight of the cab. This static stress may change, for instance when the driver enters, when a second person climbs in, when drivers of different weights get into the cab, when the cab carries an additional load, and the like. In order to avoid static stress of the support unit, deviating from the normal weight load used as basis for the design of the support unit, causing the directional control valve to always be in one of its two open-positions, thereby putting the support cylinder into one of its two final positions so that it no longer can alter its length, or is limited in alteration, the support unit of the invention is provided with a rod and an absorber element. The absorber element is designed in such a manner that it is partically rigid for the frequencies of the dynamic stresses, so that the joint by which the absorber element is connected to the lever is like an abutment for the lever, when subject to these frequencies. In motions with lower frequencies, however, the absorber element will yield. If, because of a change in the static stress of the support unit, the distance between the support cylinder and cab changes, the directional control valve is placed into one of two open positions. Simultaneously, the rod is lengthened or shortened, giving elastic resistance to this change in length, creating a force acting on the rod and thus on the lever, until the rod again has its normal length. This aforementioned force causes the directional control valve to return to its locked position, since the absorber element yields to a low-frequency stress, and permits a pivoting of the lever. The support unit, therefore, is returned to a condition by the rod in which the directional control valve, in spite of the altered static stress on the support unit, regains its locked position, so that the support piston inside the support cylinder is not moved into one of its end positions by the change in the static stress.

In a preferred embodiment of the invention, a provision can be made whereby the rod has a spring housing in which two compression springs are co-axially arranged, resting against the ends of the spring housing and holding a spring plate between them, to which spring plate one section of the rod is attached, the other rod section being attached to the spring housing. Preferably, that end of the absorber element which is not coupled to the lever is linked to the element of the support cylinder which rests against the cab by way of the spring element. In this design, the absorber element is carried along by the support cylinder whenever it is shortened or lengthened, so that there is a direct reaction coupling of the shortening or lengthening of the support cylinder with the valve body of the directional control valve. Preferably, the absorber element is linked to a second arm of the lever, not connected with the valve body, achieving a gear ratio which is greater than one between the motion of the valve body and the change in the distance between the cab and the directional control valve, making the support unit particularly responsive. It is, however, also possible to have one end of the absorber element affect any other position along the lever, only the section of the lever arm between the bearing point of the lever at the cab and the joint between the lever and valve body being excluded, and the absorber element not being permitted to affect the joint between the rod and the lever, when the other end of the absorber element is linked to the chassis.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
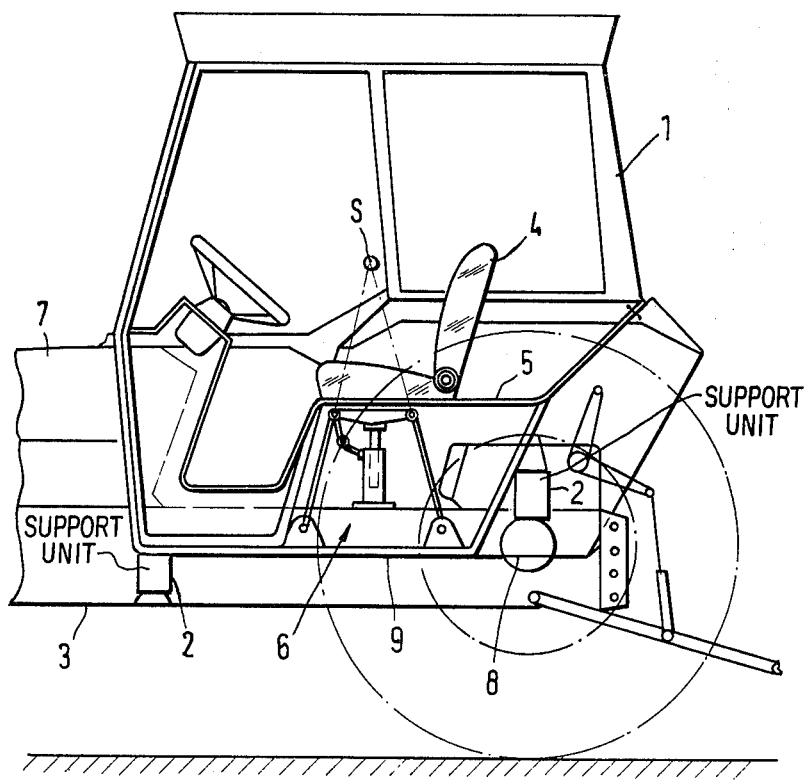
FIG. 1 shows the cab of a tractor and the preferred application of a support unit of the invention in a lateral view.

The tractor shown in FIG. 1 has a self-supporting cab 1, which rests on the chassis 3 of the tractor by way of support units 2 of the invention. In the interior of the cab, and underneath the driver's seat 4, the cab-floor 5 is brought upwards as far as the lower edge of the driver's seat, so that underneath and outside the cabin a guide mechanism 6 can be positioned which, in the case shown, is designed in such a mannner that the cab can move about the center of gravity S located in the interior of the cab, above the driver's seat 4.

Preferably, four support units 2 are provided for the support of the cab 1; two at the front end of the cab at both sides of the hood 7 and two in the rear, resting on the rear axle 8.

The support unit of the invention 2 has a support cylinder 10, which supports the bottom 9 of the cab 1 by way of a spring element 11. The rod 12 of the support piston 13 of the support cylinder rests against the chassis 3 of the tractor in such a manner that motions of the rod at an angle around the rod support point, are possible, but axial motions are not. The housing 15 of a directional control valve 16 is rigidly connected with the housing 14 of the support cylinder 10. The control valve 16 has a valve body 17 designed as piston valve which may assume one of three positions A, B and C. The axes of the support cylinder 10 and of the directional control valve 16, or the valve body 17, respectively, are parallel to each other.

The chamber of the support cylinder at the front side of the support piston 18 is connected with the directional 00919 control valve 16 by way of a first hydraulic line 19. In position A, the directional control valve connects the line 19 with a pressure source 20. In its position C, the directional control valve 16 connects line 19 with an unpressurized drain 21 by means of a return line 22. Position B is the locking position of the directional control valve 16, in which the connection of line 19 with the drain 21, as well as with the pressure source 20, is blocked.

The pressure source 20 preferably is designed as a constant pressure circuit and comprises a pressure accumulator 23, which, by way of a pressure line 24 and a check valve 25 is fed by a constant-pressure pump 26. The pressure accumulator 23, by means of a feed line 27, is in connection with the housing 15 of the directional control valve 16. The constant-pressure circuit is designed in such a way that it will provide the requisite amounts of fluid at all times. A constant-pressure circuit has a greater response than a uniflow circuit, and a pressure accumulator assigned to a constant-pressure circuit will without difficulty provide the high efficiency required for the support of a cab. If the vehicle should have a constant-pressure power brake system or a constant-pressure trailer brake system, the load valve required for these systems may also supply fluid to the constant-pressure circuit of the support unit. In this case it would be practical to provide a small pressure accumulator specifically for the support unit in order to improve the reaction speed of the support unit.

The valve body 17, at one of its ends having a joint 29, is articulated to a lever 30 which in turn is pivotably held in a bearing 31 on the floor 9 of the cab 1. The lever 30 has one first lever arm 32 (the left in FIG. 2) and a second lever arm 33. The length of the lever arm section between the joint 29 and the bearing 31 is always larger than zero.

At the free end of the lever arm 32, a rod 35 is journaled to a joint 34, the other end of the rod 35 being journaled to the chassis 3. The length of the rod is adjustable with an elastic means or resistance, the rod 35 always attempting to assume its normal length as long as it is either shortened or lengthened relative to its normal length. For this purpose, the rod 35 is provided with a cylindrical spring housing 36 to which the second rod or rod section 37 journaled to the chassis 3 is coaxially and rigidly fixed. Within the spring housing 36, two cylindrical helical pressure springs 38 and 39 are co-axially arranged, resting against the end of the spring housing 36. A spring plate 40 is located between the two pressure springs, to which spring plate the other or first rod or rod section 41 is rigidly connected. Whenever the forces of the two pressure springs 38 and 39 are in balance, the rod 35 has its normal length. When the rod is either extended or compressed, this balance is disturbed, so that a resulting force affects the spring plate 40 which endeavors to either extend or compress the rod 35 to its normal length.

At the first or free end of the other arm of the lever 33 an absorber element 43 is journaled in a joint 42. The second end of the absorber element is journaled in a joint 44 on the housing 14 of the support cylinder 10. The absorber element 43 has an adjustable length and is unelastic. Preferably, it is designed as a hydraulic telescoping absorber, providing high resistance to fast relative telescoping motions between its two ends and low resistance of its two ends to slow relative telescoping motions, so that the absorber element 43 is practically rigid for load stresses of high frequency and yielding against load stresses of a low frequency. Preferably, the absorption factor of the absorber element 43 is adjustable and is adjusted in such a way that in practice the absorber element 43 does not yield for frequencies of dynamic stress such as occur in a travelling vehicle. However, the absorber element 43 can be slowly lengthened or shortened, and in the position obtained there will be no residual force attempting to alter the length of the absorber element. The following is a description of the operation of the support unit.

Whenever the vehicle passes over a ground elevation, the chassis 3 rises relative to the cab 1, somewhat compressing the spring element 11 and also lifting the support unit 10, as well as the housing 15 of the directional control valve 16. The lever 30 in its bearing 31 thus pivots counter-clockwise (in FIG. 2) since the absorber element 43, under the influence of this pulsating stress is practically rigid, thereby pressing the joint 42 upwards. Because of this pivoting motion of the lever 30, the valve body 17 in the housing 15 of the directional valve 16 is displaced downward into position C, so that the line 19 by way of the return line 22, comes in connection with the unpressurized drain 21, permitting fluid to be discharged from the support cylinder 10. This causes a shortening of the support cylinder 10, so that an additional compression of the spring element 11 is not necessary, to compensate for the ground elevation which is being traversed. Therefore, only very little spring energy is stored in the spring element 11, so that the expansion of the spring element 11 does not create any vibrations and swaying motions of the cab 1. While the support cylinder 10 is shortened, it moves downward relative to the cab 1, taking along the housing 15 of the directional control valve 16 as well as the absorber element 43, both of these steps causing the valve body 17 to be returned to its position B, so that the drainage of fluid from the support cylinder 10 is stopped as soon as the support cylinder 10 is shortened so far that the spring element 11, in spite of the ground elevation, has a length corresponding to a static load.

As the chassis 3 moves downward, while the vehicle travels across the downward incline of the ground elevation, the lever 30 pivots in its bearing, moving in a clockwise direction, since the distance between the housing 14 of the support cylinder 10 and the floor 9 is at first increased and the housing 14 takes along the absorber element 43 which is practically rigid for the prevailing frequencies. In doing so, the valve body 17 of the directional control valve is moved into the position A, so that the line 19 connects with feeder line 27 and the frontal side of the support piston 18 is fed pressurized fluid from the pressure source 20. In this manner, the fluid is fed into the support cylinder 10 so that the latter extends in length and thereby compensates for the difference in the distance between the floor 9 and the chassis 3. During the lengthening of the support cylinder 10, the housing 15 of the directional control valve 16 is moved upward while, simultaneously, the absorber element 43 is moving upward, so that the valve body 17 is returned to its position B as soon as the initial conditions shown in FIG. 2 have been restored. In this manner, the ground elevation has been compensated for first by a shortening and then a lengthening of the support cylinder 10. The spring element 11 in this operation is only initially compressed somewhat, or lengthened somewhat, respectively. There is no accumulated spring energy causing vibrations and motion. Since the absorber element 43 and the valve body 17 are journaled to different arms of the lever 30, the relative motion between support cylinder 10 and the cab 1 is augmented at the valve body 17, so that the support unit is highly responsive. When passing over a pothole, the support unit operates in a corresponding manner, first providing an extension of the support cylinder 10, as has been described above for the downward incline of the ground elevation, followed by a shortening of the support cylinder, as has been described above for a rise of the ground elevation.

Figure 2:
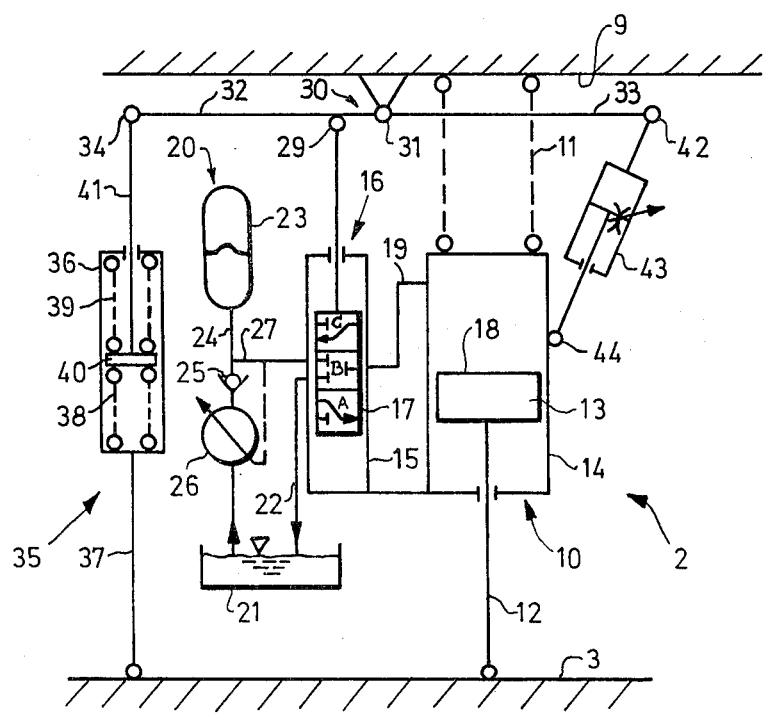
FIG. 2 is a schematic illustration of the structure of a support unit of the invention.

Whenever the static load of the support unit 2—starting with a condition ad depicted in FIG. 2—is increased, the spring element 11 is compressed more and thus shortened, so that the distance between cab 1 and the support cylinder 10 is reduced, the lever 30 is pivoted in a counterclockwise sense, and the directional control valve is placed in its position C, just as has been described for a rising incline of a ground elevation. The shortening of the support cylinder 10, however, does not lead to a return of the directional control valve 16 into its position B, since the spring element 11, given the now greater weight of the cab 1 does not expand again and the cab follows the shortening of the support cylinder 10. The directional valve would thus remain in its position C, if special steps were not taken, so that the support cylinder 10 would be completely emptied.

In order to prevent this, the rod 35 and the absorber element 43 are provided. During the aforedescribed pivoting of the lever 30 in a counterclockwise direction, the rod 35 is shortened against the force of the pressure spring 38. This results in a force at the free end of the lever arm 32 which attempts to move the latter in a clockwise direction, and does in fact achieve such movement, since the absorber element 43 offers little resistance to relatively slow motions, so that the rod 35, while shortening the absorber element 43, extends to its normal length. Since, in doing so, the lever 30 is pivoted in a clockwise direction, it pulls the valve body 17 in the housing 15 upwards, so that the valve body 17 is returned to its position B and the evacuation of the support cylinder 10 is terminated. Thus, the support unit achieves a new condition of balance when the cab 1 is of greater weight, in which the rod 35 has its normal length. The directional control valve 16 thus assumes its locking position B and when compared with the condition as shown in FIG. 2—the spring element is more compressed and shortened, the support cylinder 10 is shortened and the absorber element is shortened. Starting from this new condition of balance, the support unit absorbs dynamic stresses in the same way as has been described above for the travel over ground elevation and the passing over a pothole.

As soon as the static load of the support unit—compared to the condition as shown in FIG. 2—is lowered, the rod 35 guides the support unit in a corresponding manner into a new balanced condition, whereby the rod 35 first is lengthened against the force of a pressure spring 39, and then returns to its shortened normal length while lengthening the absorber element 43, bringing valve body 17 from its position A into its position B.

The invention is not limited to use in the aforedescribed embodiment. As an example, the absorber element 43 may affect the lever arm 32, though not in the area of the lever arm segment between bearing 31 and the joint 29. Also, the absorber element 43 need not be journaled to that element of the support cylinder 10 which is supported against the cab 1 by way of the spring element 11. The end of the absorber element 43 which is not connected with lever 30 may instead be journaled to the chassis 3 or to the cab 1, in which case, however, the reaction coupling effect of the absorber element 43 on the motion of the valve body 17 is lost.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A support unit for a cab of a utilitarian vehicle having a separate cab and chassis, said support unit comprising:
 a hydraulic support cylinder unit including a cylinder, a piston and a spring element, said piston being axially fixed to one of said chassis and said cab, and said spring element being connected to the other of said chassis and said cab;
 a directional control valve having a housing fixed to said cylinder of said hydraulic support cylinder unit and including a valve body;
 a first hydraulic line connecting said directional control valve to said hydraulic support cylinder;

a lever pivoted to said cab and having a lever arm to which said valve body is journaled;

a first rod having one end journaled to said lever;

elastic means fixed to said chassis and adjustably fixed to said first rod, said elastic means being adapted to elastically bias said first rod into a predetermined position relative to said elastic means:

an absorber element having an inelastically adjustable length, said absorber element having one end journalled to said lever and a second end journalled to one of said directional control valve and said chassis;

a hydraulic fluid pressure source connected to said control valve; and a hydraulic fluid drain connected to said control valve, wherein said control valve body is adapted to selectively connect one of said pressure source and fluid drain to said first hydraulic line.

2. The support unit of claim 1 wherein said elastic means comprises:

a spring housing having two ends, the other end of said first rod extending into one of said two ends of said spring housing;

a spring plate fixed to said other end of said first rod;

compression springs supported between said spring plate and each of said two ends of said spring housing; and a second rod fixed between said chassis and the other end of said spring housing.

3. The support unit of claims 1 or 2 wherein said second end of said absorber element is fixed to said support cylinder unit.

4. The support unit of claims 1 or 2 wherein said lever includes a second lever arm and wherein said first end of said absorber unit is journalled to said second lever arm.

* * * * *